United States Patent
Liu et al.

(10) Patent No.: US 12,110,230 B2
(45) Date of Patent: Oct. 8, 2024

(54) EFFICIENT MICROWAVE PREPARATION METHOD WITH ONE-STEP SIMULTANEOUS REDUCTION/EMBEDDING AND APPLICATION OF METAL MONATOMIC-DOPED REDUCED GRAPHENE OXIDE DIELECTRIC MATERIAL

(71) Applicant: NORTH UNIVERSITY OF CHINA, Taiyuan (CN)

(72) Inventors: Yaqing Liu, Taiyuan (CN); Yanan Liu, Taiyuan (CN); Chaoyang Wu, Taiyuan (CN); Guizhe Zhao, Taiyuan (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 0 days.

(21) Appl. No.: 18/430,993

(22) Filed: Feb. 2, 2024

(65) Prior Publication Data
US 2024/0174518 A1    May 30, 2024

Related U.S. Application Data

(63) Continuation of application No. PCT/CN2023/118470, filed on Sep. 13, 2023.

(30) Foreign Application Priority Data

Aug. 18, 2023  (CN) .......................... 202311043451.9

(51) Int. Cl.
*C01B 32/198* (2017.01)
*C01B 32/184* (2017.01)

(52) U.S. Cl.
CPC .......... *C01B 32/198* (2017.08); *C01B 32/184* (2017.08); *C01P 2002/01* (2013.01); *C01P 2002/08* (2013.01); *C01P 2002/72* (2013.01); *C01P 2004/04* (2013.01); *C01P 2006/40* (2013.01); *C01P 2006/42* (2013.01)

(58) Field of Classification Search
CPC ............................ C01B 32/184; C01B 32/198
See application file for complete search history.

(56) References Cited

U.S. PATENT DOCUMENTS

2017/0136062 A1    5/2017    Alsharaeh

FOREIGN PATENT DOCUMENTS

| CN | 104449561 A | 3/2015 |
|---|---|---|
| CN | 106159199 A | 11/2016 |
| CN | 107180964 A | 9/2017 |
| CN | 107333460 A | 11/2017 |
| CN | 109348696 A | 2/2019 |
| CN | 111057522 A | 4/2020 |
| CN | 115196621 A | 10/2022 |
| KR | 20140102480 A | 8/2014 |
| WO | 2014042259 A1 | 3/2014 |

OTHER PUBLICATIONS

Guoxian Li, "Synthesis and Microwave Absorbing Properties of Graphene/Magnetic-particle Nanocomposite Materials", China Excellent Master's dissertation Full text database Engineering Science and Technology I series, Apr. 15, 2013, Entire document.

Xinxin Xie et al., "One step self triggered microwave assisted fabrication of NiCo/graphene for microwave attenuation", Journal of Materials Science: Materials in Electronics, Jun. 20, 2020, vol. 31, abstract part, Experimental procedure section on p. 12468, Introduction, paragraph 2 on p. 12467.

Huilong Fei et al. "Microwave-Assisted Rapid Synthesis of Graphene-Supported Single Atomic Metals", Advanced Materials, Aug. 29, 2018, 1802146, Entire document.

Yabin Ma, "Preparation and regulation of electromagnetic properties of reduced graphene oxide based electromagnetic wave absorbers", China Excellent Master's dissertation Full text database Engineering Science and Technology I series, Jan. 15, 2023, Entire document.

Xin Gao, "Microwave Absorbing Properties of Magnetic Metal and Its Composites after Corrosion Process", China Excellent Master's dissertation Full text database Engineering Science and Technology I series, Mar. 15, 2022, Entire document.

*Primary Examiner* — Stuart L Hendrickson

(57) ABSTRACT

An efficient microwave-assisted preparation method with one-step simultaneous reduction/embedding of a metal monatomic-doped reduced graphene oxide dielectric material. A metal salt aqueous solution is added to a graphene oxide aqueous dispersion to obtain a mixed dispersion. The mixed dispersion is mechanically stirred, such that the metal salt fully interacts with the graphene oxide, and the metal ions are uniformly loaded on a surface of the graphene oxide sheets through the interaction between metal ions and the oxygen-containing functional groups of the graphene oxide. The mixed dispersion is freeze-dried to obtain a metal salt/graphene oxide complex, which is subjected to a microwave treatment in the presence of an initiator in a microwave oven to allow reduction to obtain the metal monatomic-doped reduced graphene oxide dielectric material. An application of the metal monatomic-doped reduced graphene oxide dielectric material is also provided.

4 Claims, 18 Drawing Sheets

EFFICIENT MICROWAVE PREPARATION METHOD WITH ONE-STEP SIMULTANEOUS REDUCTION/EMBEDDING AND APPLICATION OF METAL MONATOMIC-DOPED REDUCED GRAPHENE OXIDE DIELECTRIC MATERIAL

CROSS-REFERENCE TO RELATED APPLICATIONS

This application is a continuation of International Patent Application No. PCT/CN2023/118470, filed on Sep. 13, 2023, which claims the benefit of priority from Chinese Patent Application No. 202311043451.9, filed on Aug. 18, 2023. The content of the aforementioned application, including any intervening amendments made thereto, is incorporated herein by reference in its entirety.

TECHNICAL FIELD

This application relates to dielectric materials, and more particularly to an efficient microwave preparation method with one-step simultaneous reduction/embedding and an application of a metal monatomic-doped reduced graphene oxide dielectric material.

BACKGROUND

Electric polarization refers to a phenomenon that is the relative shift of positive and negative charges in opposite directions rather than directional movement and is dominant when a material is subject to an applied electric field. Materials that are characterized by electric polarization as the main response are called dielectric materials. The polarization inside a dielectric is essentially the separation of positive and negative charges. Therefore, the dielectric constant and dielectric loss (tan δ) are two of the main indicators for evaluating the dielectric properties of a material.

As an industrially-produced low-cost two-dimensional nanoparticle, graphene oxide (GO) has been extensively used in many fields in recent years. Compared with graphene nanosheets (GNPs), GO has abundant oxygen-containing functional groups on its surface, and various functionalized GO products can be obtained by modifying these oxygen-containing functional groups, allowing for a wider application range. In addition, GO can also be transformed into reduced graphene oxide (rGO) with excellent conductive properties in the presence of a reducing agent or under heating, which can be used as a current collector in the field of microelectronics. GO is commonly compounded with other nanoparticles to prepare hybrid materials for different functional purposes. Currently, nanoparticles that can be combined with GO to form hybrid materials mainly include metals, metal oxides, inorganic ceramics, and carbon materials. The resulting hybrid nanoparticles are commonly used in many fields, such as electrochemical sensors, catalysts, fuel cells, and polymer-based functional composites.

A variety of methods, such as the hydrothermal method, dipping-pyrolysis method, chemical vapor deposition-based epitaxy and doping method, microwave synthesis method, etc., have been explored for the preparation of metal monatomic-doped reduced graphene oxide. Among them, the microwave synthesis method does not require additional reducing agents, resulting in a greener process and a purer product. Moreover, the reaction is carried out in solid form, thereby avoiding problems such as irreversible agglomeration occurring during the drying process of a liquid reaction system. In addition, the reaction of the microwave synthesis method can be completed generally within a few seconds or tens of seconds, such that various side reactions can be effectively inhibited, which facilitates meeting the requirement of industrial production. However, the microwave preparation of metal monatomic-doped reduced graphene oxide dielectric materials has not been reported yet. The introduction of a metal monatomic into the graphene structure will lead to local asymmetry within the two-dimensional structure plane, such that a permanent dipole is formed, thereby enhancing the dielectric relaxation, improving the polarization features of the system, and enhancing the graphene properties. Therefore, the metal monatomic-doped reduced graphene oxide dielectric materials can be widely used in supercapacitors, hydrogen storage materials, batteries, transistors, biosensors, electromagnetic wave absorption, and other fields.

SUMMARY

An object of the disclosure is to provide an efficient microwave preparation method with one-step simultaneous reduction/embedding and an application of a metal monatomic-doped reduced graphene oxide dielectric material, so as to solve the following problems (i) the conventional liquid-phase preparation process of metal monatomic-doped reduced graphene oxide may easily lead to irreversible agglomeration during drying; and (ii) when used as a functional filler, the filling amount is high, and the performance of composites is poor, thereby restricting the practical applications.

In order to achieve the above objective, the following technical solutions are adopted.

In a first aspect, this application provides an efficient microwave preparation method with one-step simultaneous reduction/embedding of a metal monatomic-doped reduced graphene oxide dielectric material, comprising:

step (1) adding deionized water to a graphene oxide slurry followed by an ultrasonic dispersion to obtain a graphene oxide aqueous dispersion with a preset concentration;

step (2) dissolving a metal salt in a powder form with deionized water to obtain a metal salt aqueous solution with a preset concentration;

step (3) adding the metal salt aqueous solution to the graphene oxide aqueous dispersion followed by mechanical stirring to obtain a mixed dispersion, wherein the mechanical stirring is performed such that the metal salt fully interacts with the graphene oxide, and the metal ions are loaded on a surface of the graphene oxide utilizing an interaction between the metal ions and the oxygen-containing functional groups of the graphene oxide;

step (4) freeze-drying the mixed dispersion obtained in step (3) to obtain a metal salt/graphene oxide complex; and step (5) subjecting the metal salt/graphene oxide complex to a microwave treatment in the presence of an initiator in a microwave oven to allow the simultaneous reduction reactions of the metal salt and the graphene oxide and the embedding of the metal atoms generated by the reduction of the metal salts into the lattices of the reduced graphene oxide generated by the reduction of graphene oxide, so as to obtain the metal monatomic-doped reduced graphene oxide dielectric material;

In some embodiments, in step (1), the ultrasonic dispersion is performed at 100-300 W for 10-30 min, and the preset concentration of the graphene oxide aqueous dispersion is 1-3 mg/mL.

In some embodiments, in step (2), the metal salt is one or more combinations of an iron salt, a cobalt salt, a nickel salt, and the preset concentration of the metal salt aqueous solution is 0.02-0.20 mg/mL.

In some embodiments, in step (3), the mechanical stirring is performed at 100-300 rpm for 20-40 min.

In some embodiments, in step (4), the mixed dispersion is freeze-dried at a temperature ranging from −40° C. to −10° C. for 24-72 h.

In some embodiments, in step (5), the initiator is selected from the group consisting of a chopped carbon fiber bundle, a graphite powder, and a copper wire, and the initiator is 1 wt. % of a mass of the metal salt/graphene oxide complex.

In some embodiments, in step (5), the microwave treatment is performed at 100-700 W for 4-14 s.

In a second aspect, this application provides a dielectric device, wherein the dielectric device comprises a metal monatomic-doped reduced graphene oxide dielectric material prepared by the above efficient microwave preparation method with one-step simultaneous reduction/embedding.

In some embodiments, the dielectric device is a supercapacitor, a hydrogen storage device, a battery, a transistor, a biosensor, or an electromagnetic wave absorbing device.

In some embodiments, when the dielectric device is the electromagnetic wave absorbing device, a filling amount of the metal monatomic-doped reduced graphene oxide dielectric material in a matrix of the electromagnetic wave absorbing device is less than or equal to 1 wt. %.

Compared to the prior art, the present disclosure has the following beneficial effects.

(1) The microwave reduction reaction in this application is completely carried out in a solid phase form, which can effectively avoid problems such as irreversible agglomeration occurring during the drying stage of a conventional liquid phase reduction process.

(2) The conventional liquid-phase reduction process requires various chemical reducing agents, which will not only significantly increase the cost and extend the production cycle, but also cause serious environmental pollution. In particular, both the treatment and discharge of the used metal salt waste liquid will lead to serious environmental pollution. This application adopts a solid-phase microwave reduction process, which can achieve the effective control of the reduction effect without producing industrial waste liquid, allowing for a greener and more environmentally friendly process and high purity.

(3) This application adopts a one-step microwave reduction reaction to simultaneously complete the reduction of graphene oxide, the reduction of metal ions, and the embedding of metal atoms generated by the reduction of metal ions in the lattices of the reduced graphene oxide. In addition, the reduced graphene oxide can continuously transfer thermal energy to reduce the adjacent metal salt/graphene oxide complex until the reaction is completed, thereby reducing the time consumption.

(4) The microwave reduction process in this application is convenient and rapid, only lasts for a few seconds to a dozen seconds, and can effectively inhibit the occurrence of various side reactions in the conventional high-temperature reduction process while saving energy, thereby satisfying the demand for industrialized large-scale production of structurally-stable products.

BRIEF DESCRIPTION OF THE DRAWINGS

The accompanying drawings provided herein are incorporated in and constitute a part of the specification, which illustrate embodiments consistent with the present disclosure and serve to explain the principles of the present disclosure in conjunction with the specification.

In order to make the technical solutions of the embodiments of the present disclosure or the technical solutions in the prior art clearer, the accompanying drawings required in the description of the embodiments or prior art will be briefly described below. Obviously, for those of ordinary skill in the art, other drawings can be obtained based on the drawings of the disclosure without making creative efforts.

DETAILED DESCRIPTION OF EMBODIMENTS

Figure 1:
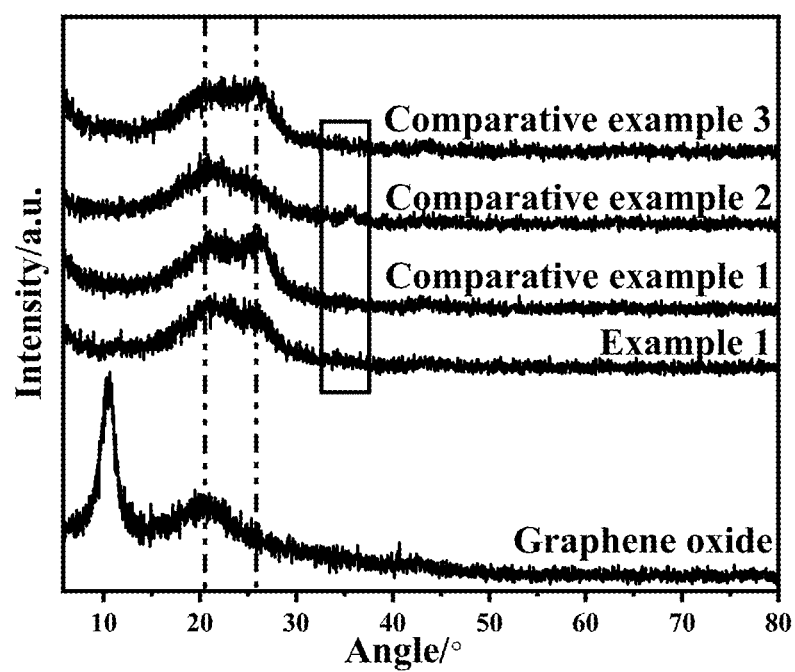
FIG. 1 shows X-ray diffraction (XRD) patterns of a Fe monatomic-doped reduced graphene oxide dielectric material provided in Example 1 of the present disclosure, a Fe sub-nanocluster-doped reduced graphene oxide dielectric material provided in Comparative Example 1, a Fe-containing nanoparticle-loaded reduced graphene oxide dielectric material provided in Comparative Example 2, and a microwave-reduced graphene oxide dielectric material provided in Comparative Example 3.

In order to make the purpose, technical solutions, and advantages of the embodiments of the present disclosure clearer, the technical solutions in the embodiments of the present disclosure will be clearly and completely described below. It should be noted that, as long as there is no contradiction, the embodiments of the present disclosure and the features therein can be combined with each other.

Many specific details are set forth in the following description to facilitate the full understanding of the present disclosure, but the present disclosure can also be implemented in other ways different from those described herein. Obviously, provided herein are merely some of the embodiments of the disclosure, instead of all of the embodiments.

An embodiment of the disclosure provides an efficient microwave preparation method with one-step simultaneous reduction/embedding of a metal monatomic-doped reduced graphene oxide dielectric material, which includes the following steps.

Step (1) A graphene oxide slurry is added with deionized water and dispersed under ultrasonication to obtain a graphene oxide aqueous dispersion with a preset concentration.

Step (2) A metal salt powder is dissolved with deionized water to obtain a metal salt aqueous solution with a preset concentration.

Step (3) The metal salt aqueous solution is added to the graphene oxide aqueous dispersion to obtain a mixed dispersion. The mixed dispersion is subjected to mechanical stirring such that the metal salt fully interacts with the graphene oxide, and the metal ions are evenly loaded on a surface of the graphene oxide sheets by means of the interaction between the metal ions and the oxygen-containing functional groups of the graphene oxide.

Step (4) The mixed dispersion obtained in step (3) is freeze-dried to obtain a metal salt/graphene oxide complex.

Step (5) The metal salt/graphene oxide complex obtained in step (4) is subjected to a microwave treatment in the presence of an initiator in a microwave oven to allow the simultaneous reduction reactions of the metal salt and graphene oxide and the embedding of the metal atoms generated by the reduction of the metal salts into the lattices of the reduced graphene oxide generated by the reduction of graphene oxide, so as to obtain a metal monatomic-doped reduced graphene oxide dielectric material.

In this application, microwave reduction refers to a process in which microwave energy is converted into heat energy by a substance that can effectively absorb microwaves to realize the reduction reaction. Since dispersed graphite domains on the graphene oxide sheets are surrounded by large and disordered continuous oxidized regions, graphene oxide is insulating, and cannot effectively absorb microwaves. Therefore, an initiator with excellent conductivity is required. During the microwave reduction process, the microwaves are absorbed by the initiator to induce electron flow and ionize the surrounding atmosphere, and the absorbed microwaves are effectively converted into thermal energy through Joule heating, such that the temperature of the initiator and the metal salt/graphene oxide complex around the initiator is raised sharply. In this way, the reduction of graphene oxide, the reduction of the metal ions, and the embedding of metal atoms generated by the reduction of the metal ions in reduced graphene oxide lattices are simultaneously achieved in one step. In addition, the thermal energy can be continuously transferred by the reduced graphene oxide to reduce the adjacent metal salt/graphene oxide complex until the reduction reaction is completed, thereby reducing the time consumption.

In an embodiment of the disclosure, in step (1), the graphene oxide slurry is dispersed under ultrasonication at 100-300 W for 10-30 min, and the preset concentration of the graphene oxide aqueous dispersion is 1-3 mg/mL.

In an embodiment, in step (2), the metal salt is one or more combinations of an iron salt, a cobalt salt, a nickel salt, and the preset concentration of the metal salt aqueous solution is 0.02-0.20 mg/mL.

In an embodiment, in step (3), the mechanical stirring is performed at 100-300 rpm for 20-40 min.

In an embodiment, in step (4), the mixed dispersion is freeze-dried at −40 to −10° C. for 24-72 h.

In an embodiment, in step (5), the initiator is selected from the group consisting of a chopped carbon fiber bundle, a graphite powder, and a copper wire, and the initiator is 1 wt. % of a mass of the metal salt/graphene oxide complex. Specifically, the chopped carbon fiber bundle is a conventional commercial chopped carbon fiber bundle with a length of 4-10 mm, the graphite powder is a conventional commercial graphite powder with 325 mesh, and the copper wire is a conventional commercial copper wire with a diameter of 0.15 mm and a length of 4-10 mm. The initiator used in the following embodiments of the present disclosure has the same parameters as above.

In an embodiment, in step (5), the microwave treatment is performed at 100-700 W for 4-14 s.

This application also provides a dielectric device, which includes a metal monatomic-doped reduced graphene oxide dielectric material prepared by the above efficient microwave preparation method with one-step simultaneous reduction/embedding.

In an embodiment, the dielectric device is a supercapacitor, a hydrogen storage device, a battery, a transistor, a biosensor, or an electromagnetic wave absorbing device. In an embodiment, when the dielectric device is the electromagnetic wave absorbing device, a filling amount of the metal monatomic-doped reduced graphene oxide dielectric material in a matrix of the electromagnetic wave absorbing device is less than or equal to 1 wt. %.

The performance test criteria used in the embodiments of the disclosure are as follows.

(1) X-Ray Diffraction (XRD) Test

A sample was placed in a test mold and tested through an X-ray diffractometer 2700BX (Haoyuan, China).

(2) Electrical Resistivity Test 1 wt. % of the sample was evenly mixed with 99 wt. % of paraffin wax to obtain a disc with a diameter of 7.00 mm, which was tested through a four-probe resistivity tester RTS-9 (Four Probes Tech, China).

(3) Electromagnetic Parameter Test 1 wt. % of the sample was evenly mixed with 99 wt. % of paraffin wax to obtain a coaxial ring with an inner diameter of 3.04 mm and an outer diameter of 7.00 mm, which was tested on a vector network analyzer 3672C (Ceyear, China) by using a coaxial reflection/transmission method for the dielectric constant and the magnetic permeability within 2-18 GHz. The dielectric loss and magnetic loss were calculated. The electromagnetic wave absorption performance of the sample within 2-18 GHz was calculated using transmission line theory.

(4) Transmission Electron Microscopy (TEM) Test

The TEM test was performed using a field emission transmission electron microscope Talos F200S (Thermo Scientific, USA).

The specific embodiments of the present disclosure are described in detail below.

Example 1

An efficient microwave preparation method with one-step simultaneous reduction/embedding of a Fe monatomic-doped reduced graphene oxide dielectric material was provided, which included the following steps.

Step (1) A graphene oxide slurry containing 1 wt. % graphene oxide was added with deionized water and dispersed under an ultrasonic power of 200 W for 15 min to obtain a graphene oxide aqueous dispersion with a concentration of 3 mg/mL.

Step (2) Ferric sulfate powder was dissolved with deionized water to obtain a ferric sulfate aqueous solution with a concentration of 0.056 mg/mL.

Step (3) The ferric sulfate aqueous solution prepared in step (2) was added to the graphene oxide aqueous dispersion prepared in step (1) to obtain a mixed dispersion. The mixed dispersion was mechanically stirred at 100 rpm for 30 min to allow full interaction of the ferric sulfate with the graphene oxide.

Step (4) The mixed dispersion prepared in step (3) was freeze-dried at −40° C. for 24 h to obtain a ferric sulfate/graphene oxide complex.

Step (5) The ferric sulfate/graphene oxide complex obtained in step (4) was subjected to a microwave treatment in the presence of 1 wt. % of a 6-mm chopped carbon fiber bundle as an initiator in a microwave oven at a microwave power of 350 W for 10 s to allow reduction reaction of the ferric sulfate/graphene oxide complex and embedding of the metal atoms generated by the reduction of the metal salts into the lattices of the reduced graphene oxide generated by the reduction of graphene oxide, so as to obtain the Fe monatomic-doped reduced graphene oxide dielectric material.

The composition and structure of the Fe monatomic-doped reduced graphene oxide dielectric material were characterized by XRD, and the microstructure of the Fe monatomic-doped reduced graphene oxide dielectric material was characterized by TEM.

Comparative Example 1

A microwave preparation method of a Fe sub-nanocluster-doped reduced graphene oxide dielectric material was provided, which included the following steps.

Step (1) A graphene oxide slurry containing 1 wt. % graphene oxide was added with deionized water and dispersed under an ultrasonic power of 200 W for 15 min to obtain a graphene oxide aqueous dispersion with a concentration of 3 mg/mL.

Step (2) Ferric sulfate powder was dissolved with deionized water to obtain a ferric sulfate aqueous solution with a concentration of 0.3 mg/mL.

Step (3) The ferric sulfate aqueous solution prepared in step (2) was added to the graphene oxide aqueous dispersion prepared in step (1) to obtain a mixed dispersion. The mixed dispersion was mechanically stirred at 100 rpm for 30 min to allow full interaction of the ferric sulfate with the graphene oxide.

Step (4) The mixed dispersion prepared in step (3) was freeze-dried at −40° C. for 24 h to obtain a ferric sulfate/graphene oxide complex.

Step (5) The ferric sulfate/graphene oxide complex obtained in step (4) was subjected to a microwave treatment in the presence of 1 wt. % of a 6-mm chopped carbon fiber bundle as an initiator in a microwave oven at a microwave power of 350 W for 10 s to allow reduction reaction of the ferric sulfate/graphene oxide complex, so as to obtain the Fe sub-nanocluster-doped reduced graphene oxide dielectric material.

Comparative Example 2

A microwave-assisted preparation method of a Fe-containing nanoparticle-loaded reduced graphene oxide dielectric material was provided, which included the following steps.

Step (1) A graphene oxide slurry containing 1 wt. % graphene oxide was added with deionized water and dispersed under an ultrasonic power of 200 W for 15 min to obtain a graphene oxide aqueous dispersion with a concentration of 3 mg/mL.

Step (2) Ferric sulfate powder was dissolved with deionized water to obtain a ferric sulfate aqueous solution with a concentration of 1 mg/mL.

Step (3) The ferric sulfate aqueous solution prepared in step (2) was added to the graphene oxide aqueous dispersion prepared in step (1) to obtain a mixed dispersion. The mixed dispersion was mechanically stirred at 100 rpm for 30 min to allow full interaction of the ferric sulfate with the graphene oxide.

Step (4) The mixed dispersion prepared in step (3) was freeze-dried at −40° C. for 24 h to obtain a ferric sulfate/graphene oxide complex. p Step (5) The ferric sulfate/graphene oxide complex obtained in step (4) was subjected to a microwave treatment in the presence of 1 wt. % of a 6-mm chopped carbon fiber bundle as an initiator in a microwave oven at a microwave power of 350 W for 10 s to allow reduction reaction of the ferric sulfate/graphene oxide complex, so as to obtain the Fe-containing nanoparticle-loaded reduced graphene oxide dielectric material.

Comparative Example 3

A preparation method of a microwave-reduced graphene oxide dielectric material was provided, which included the following steps.

Step (1) A graphene oxide slurry containing 1 wt. % graphene oxide was added with deionized water and dispersed under an ultrasonic power of 200 W for 15 min to obtain a graphene oxide aqueous dispersion with a concentration of 3 mg/mL.

Step (2) The graphene oxide aqueous dispersion obtained in step (1) was freeze-dried at −40° C. for 24 h to obtain a graphene oxide flocculent.

Step (3) The graphene oxide flocculent obtained in step (2) was subjected to a microwave treatment in the presence of 1 wt. % of a 6-mm chopped carbon fiber bundle as an initiator in a microwave oven at a microwave power of 350 W for 10 s to allow reduction of the graphene oxide, so as to obtain the microwave-reduced graphene oxide dielectric material.

Comparative Example 4

The preparation process of Comparative Example 4 was basically the same as that of Comparative Example 3, except that the concentration of the graphene oxide aqueous dispersion in step (1) was 1 mg/mL.

Comparative Example 5

The preparation process of Comparative Example 5 was exactly the same as that of Comparative Example 3, except that the microwave power in step (3) was 700 W.

Comparative Example 6

The preparation process of Comparative Example 6 was basically the same as that of Comparative Example 3, except that the microwave power in step (3) was 100 W.

Comparative Example 7

The preparation process of Comparative Example 7 was basically the same as that of Comparative Example 3, except that the microwave treatment in step (3) was performed for 4 s.

Comparative Example 8

The preparation process of Comparative Example 8 was basically the same as that of Comparative Example 3, except that the microwave treatment in step (3) was performed for 14 s.

As illustrated in FIG. 1, compared with the XRD spectrum of the unreduced graphene oxide (i.e., the graphene oxide slurry), the (002) diffraction peak attributed to the graphene oxide at 10.58° disappears in the XRD patterns of the Fe monatomic-doped reduced graphene oxide dielectric material prepared in Example 1, the Fe sub-nanocluster-doped reduced graphene oxide dielectric material prepared in Comparative Example 1, the Fe-containing nanoparticle-loaded reduced graphene oxide dielectric material prepared in Comparative Example 2, and the microwave-reduced graphene oxide dielectric material prepared in Comparative Example 3, indicating that the oxygen-containing functional groups in these materials are effectively reduced. The diffraction peak at 2θ of 20.5° is attributed to amorphous carbon, and the diffraction peak at 2θ of 26° is generated by an interlayer stacking of graphite-like structural crystal planes. Different Fe forms will influence the interlayer stacking of the reduced graphene oxide. In addition, there are no diffraction peaks of Fe crystals in the patterns of Example 1 and Comparative Example 1, indicating that Fe crystals are not agglomerated into nanoparticles. Clusters are relatively stable microscopic or submicroscopic aggregates composed of several or even thousands of atoms, molecules, or ions through physical or chemical binding forces, whose physical and chemical properties vary with the number of atoms contained. The spatial scale of clusters ranges from a few angstroms to a few hundred angstroms, and many properties are different from those of individual atoms and molecules, as well as from solids and liquids, and cannot be obtained by simple linear epitaxy or interpolation of their properties. Therefore, clusters are regarded as a new level of material structure between atoms, molecules, and macroscopic solid objects. The properties of clusters may be quite different from those of individual atoms or molecules. Metal clusters have properties that are quite different from single atoms and nanoparticles, which may be related to the size, shape, and structure of the clusters. Sub-nanoclusters refer to tiny clusters composed of several atoms or molecules with size at a sub-nanometer scale. The size of the sub-nanoclusters is usually between 1-10 nm. Moreover, agglomerates are aggregates formed by primary particles or aggregates connected by edges or corners. There is no significant difference between the specific surface of the agglomerate and the sum of the specific surfaces of the particles or aggregates that make up the agglomerate. The process of forming agglomerates is called agglomeration. The sub-nanocluster used herein was in a special state that required fine experimental control, and the performance results of the samples were also favorable, differing from those of the conventional agglomerate systems. Regarding Comparative Example 2, a new diffraction peak is present at 2θ of 35.3°, corresponding to a (311) crystal plane of $Fe_3O_4$ nanoparticles (PDF standard card ICDD 01-089-0688), indicating the formation of Fe-containing nanoparticles.

Tested by the four-probe resistivity tester, it was obtained that resistivity of the Fe monatomic-doped reduced graphene oxide dielectric material prepared in Example 1 was $9.11 \times 10^{-2}$ Ω·m, which was 83% lower than that of the Fe sub-nanocluster-doped reduced graphene oxide dielectric material ($5.26 \times 10^{-1}$ Ω·m) prepared in Comparative Example 1, 97% lower than that of the Fe-containing nanoparticle-loaded reduced graphene oxide dielectric material (2.97 Ω·m) prepared in Comparative Example 2, and 1476% higher than that of the microwave-reduced graphene oxide dielectric material ($5.78 \times 10^{-3}$ Ω·m) prepared in Comparative Example 3. The Fe monatomic-doped reduced graphene oxide dielectric material prepared in Example 1 can be applied in the fields of supercapacitors, hydrogen storage materials, batteries, transistors, biosensors, and electromagnetic wave absorbing materials.

Figure 2:
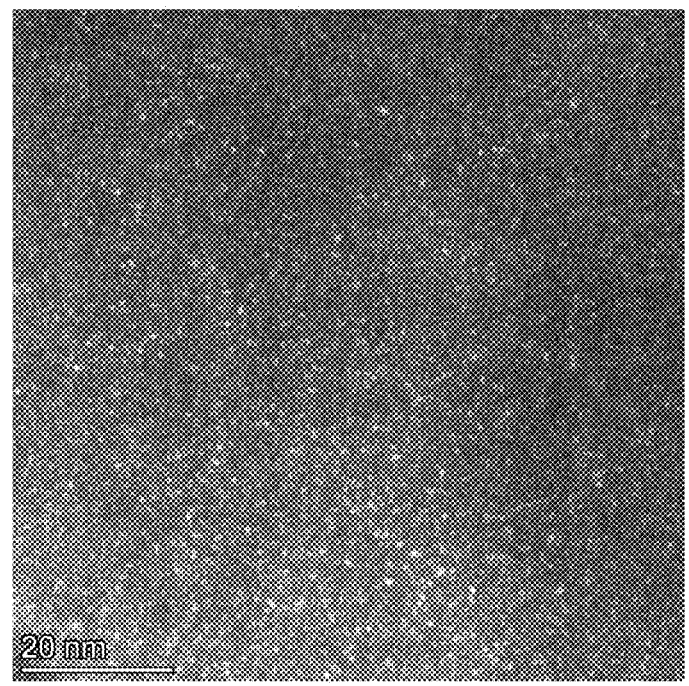
FIG. 2 is transmission electron microscopy (TEM) image of the Fe monatomic-doped reduced graphene oxide dielectric material provided in Example 1 of the present disclosure.
Figure 3:
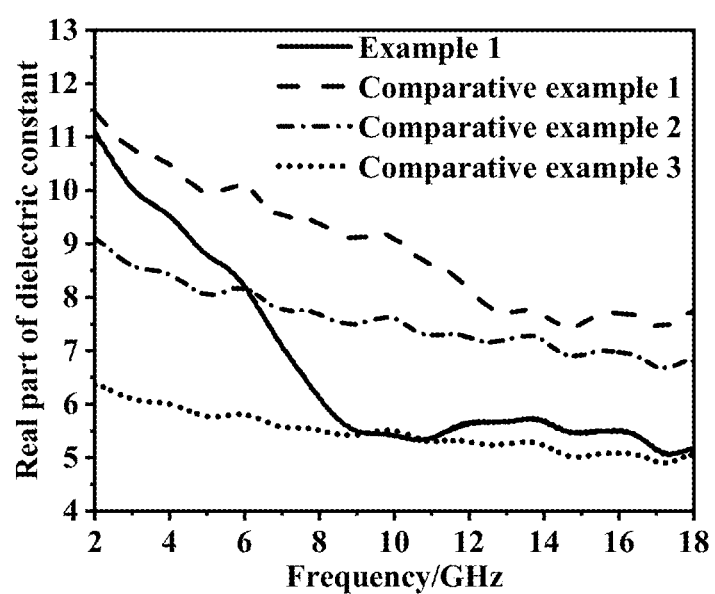
FIG. 3 shows real part curves of dielectric constants of the Fe monatomic-doped reduced graphene oxide dielectric material provided in Example 1 of the present disclosure, the Fe sub-nanocluster-doped reduced graphene oxide dielectric material provided in Comparative Example 1, the Fe-containing nanoparticle-loaded reduced graphene oxide dielectric material provided in Comparative Example 2, and the microwave-reduced graphene oxide dielectric material provided in Comparative Example 3.
Figure 4:
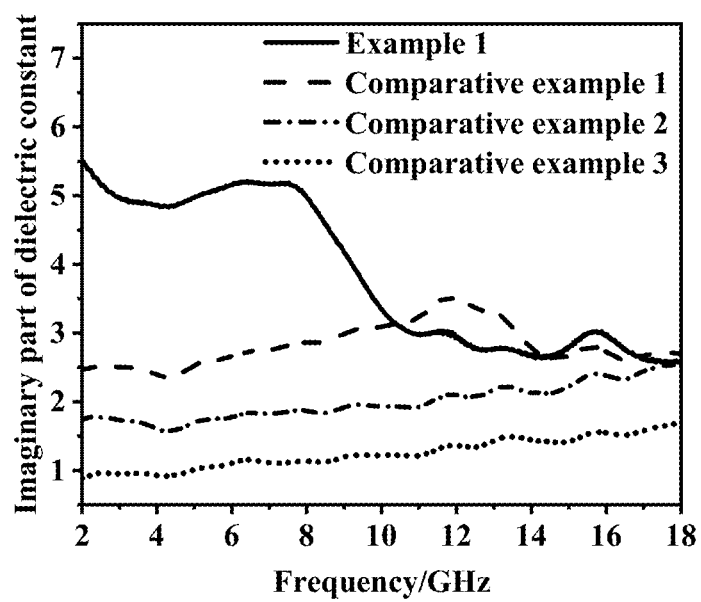
FIG. 4 shows imaginary part curves of dielectric constants of the Fe monatomic-doped reduced graphene oxide dielectric material provided in Example 1 of the present disclosure, the Fe sub-nanocluster-doped reduced graphene oxide dielectric material provided in Comparative Example 1, the Fe-containing nanoparticle-loaded reduced graphene oxide dielectric material provided in Comparative Example 2, and the microwave-reduced graphene oxide dielectric material provided in Comparative Example 3.
Figure 5:
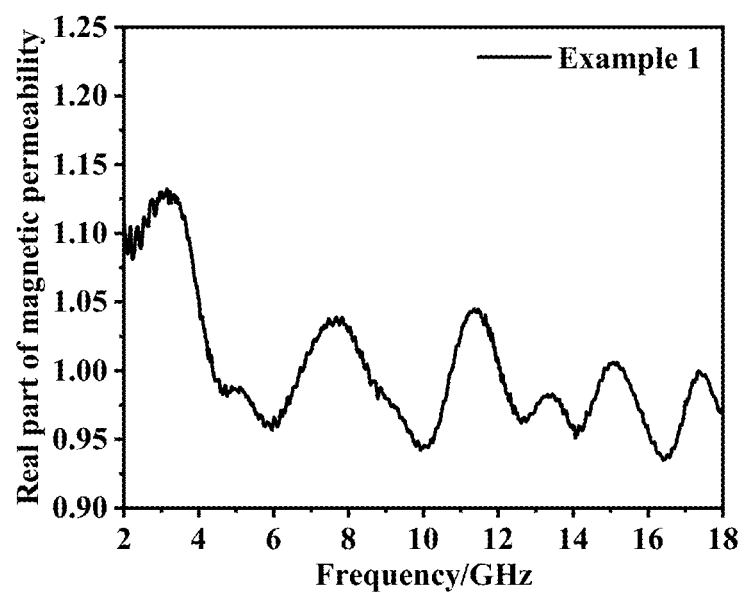
FIG. 5 shows a real part curve of magnetic permeability of the Fe monatomic-doped reduced graphene oxide dielectric material provided in Example 1 of the present disclosure.
Figure 6:
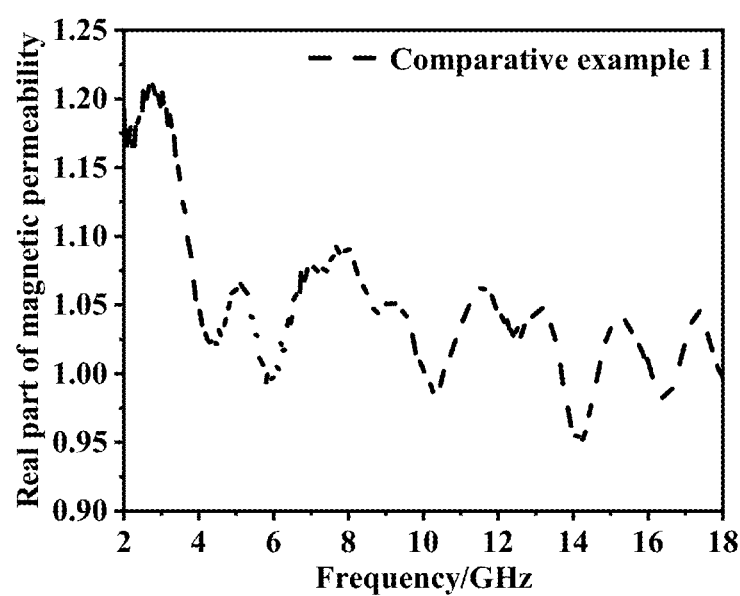
FIG. 6 shows a real part curve of magnetic permeability of the Fe sub-nanocluster-doped reduced graphene oxide dielectric material provided in Comparative Example 1.
Figure 7:
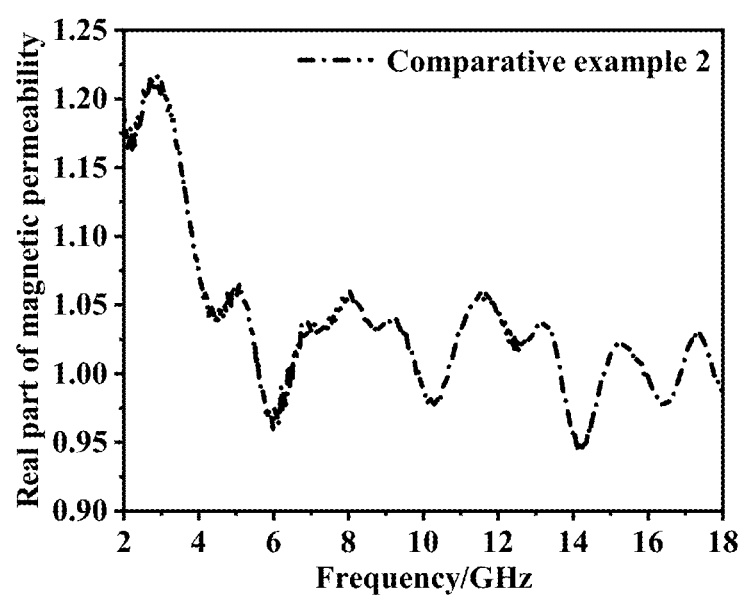
FIG. 7 shows a real part curve of magnetic permeability of the Fe-containing nanoparticle-loaded reduced graphene oxide dielectric material provided in Comparative Example 2.
Figure 8:
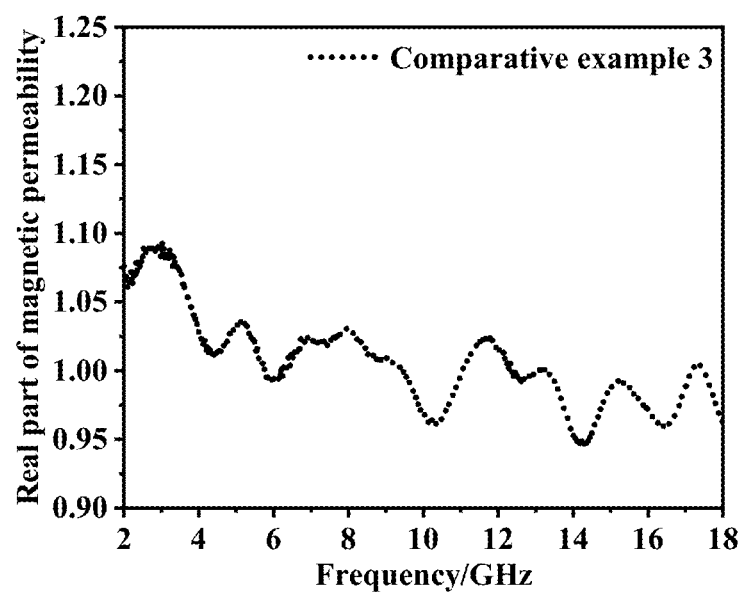
FIG. 8 shows a real part curve of magnetic permeability of the microwave-reduced graphene oxide dielectric material provided in Comparative Example 3.
Figure 9:
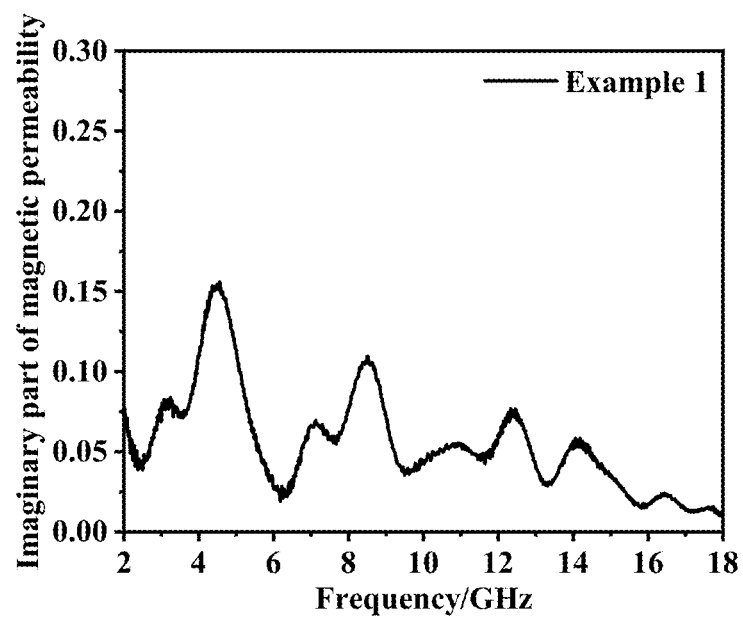
FIG. 9 shows an imaginary part curve of magnetic permeability of the Fe monatomic-doped reduced graphene oxide dielectric material provided in Example 1 of the present disclosure.
Figure 10:
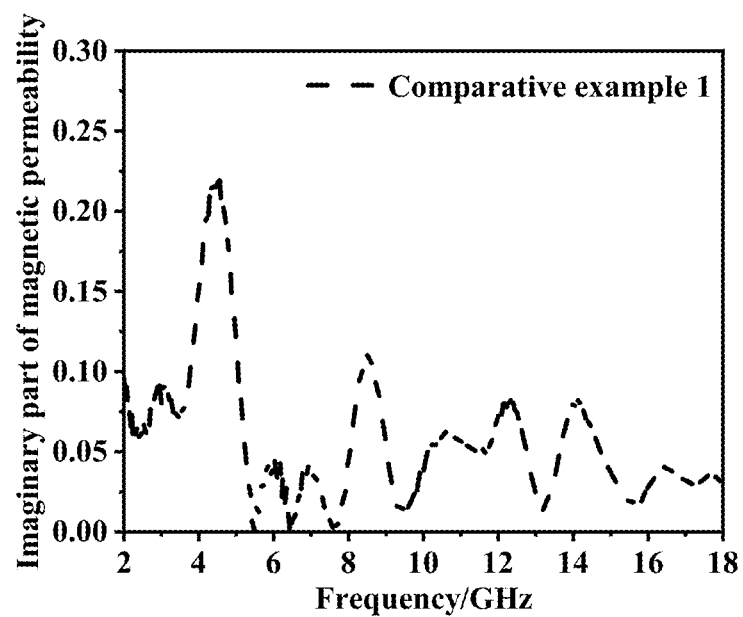
FIG. 10 shows an imaginary part curve of magnetic permeability of the Fe sub-nanocluster-doped reduced graphene oxide dielectric material provided in Comparative Example 1.
Figure 11:
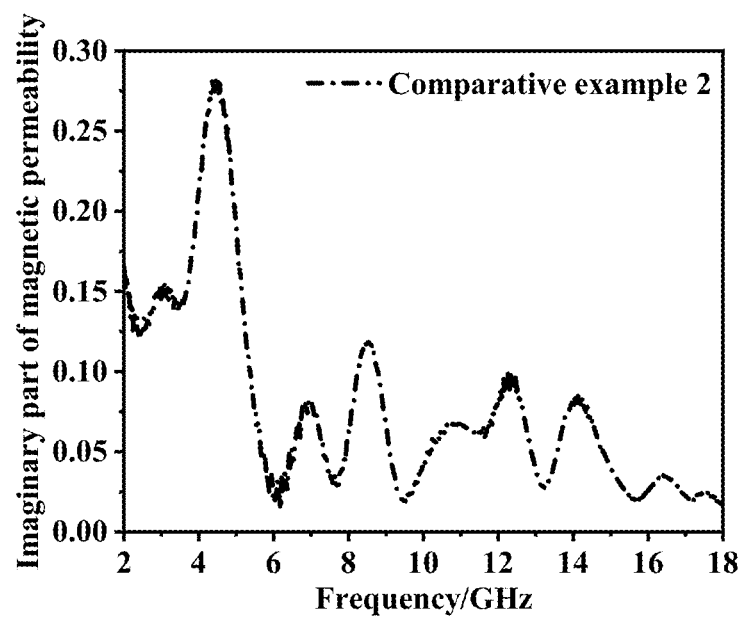
FIG. 11 shows an imaginary part curve of magnetic permeability of the Fe-containing nanoparticle-loaded reduced graphene oxide dielectric material provided in Comparative Example 2.
Figure 12:
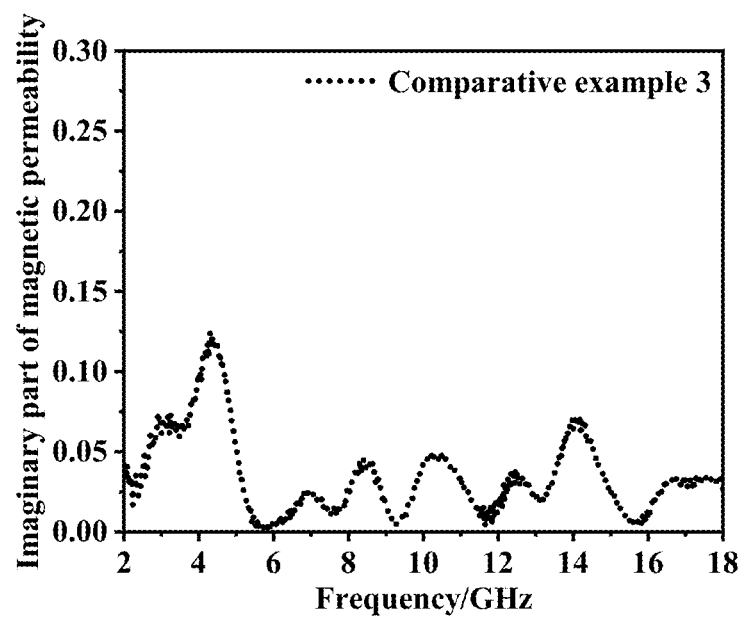
FIG. 12 shows an imaginary part curve of magnetic permeability of the microwave-reduced graphene oxide dielectric material provided in Comparative Example 3.
Figure 13:
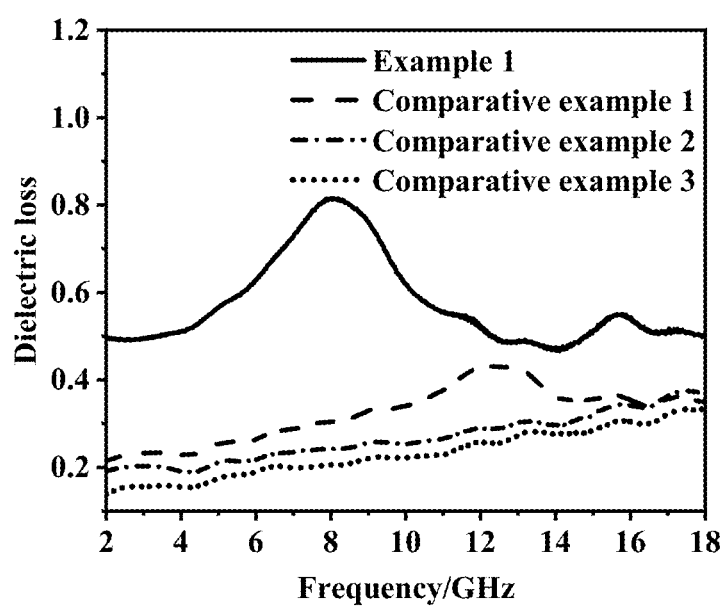
FIG. 13 shows a comparison of dielectric loss curves of the Fe monatomic-doped reduced graphene oxide dielectric material provided in Example 1 of the present disclosure, the Fe sub-nanocluster-doped reduced graphene oxide dielectric material provided in Comparative Example 1, the Fe-containing nanoparticle-loaded reduced graphene oxide dielectric material provided in Comparative Example 2, and the microwave-reduced graphene oxide dielectric material provided in Comparative Example 3.
Figure 14:
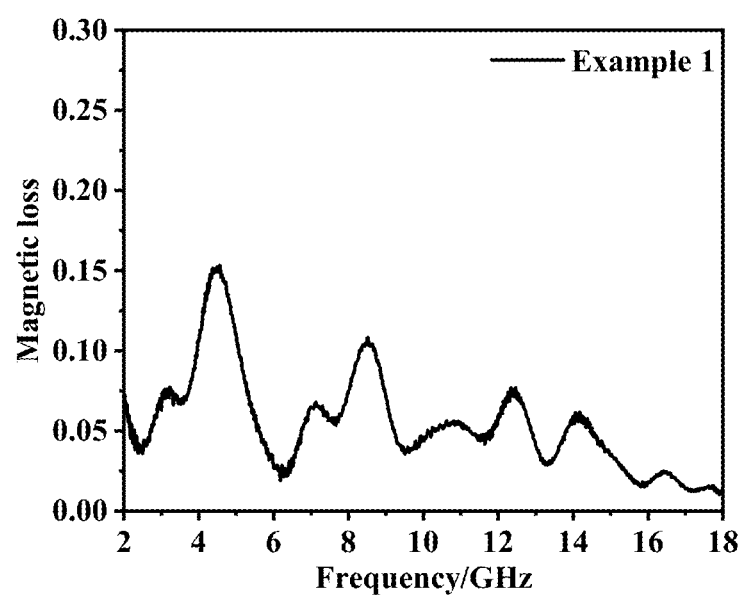
FIG. 14 shows a magnetic loss curve of the Fe monatomic-doped reduced graphene oxide dielectric material provided in Example 1 of the present disclosure.
Figure 15:
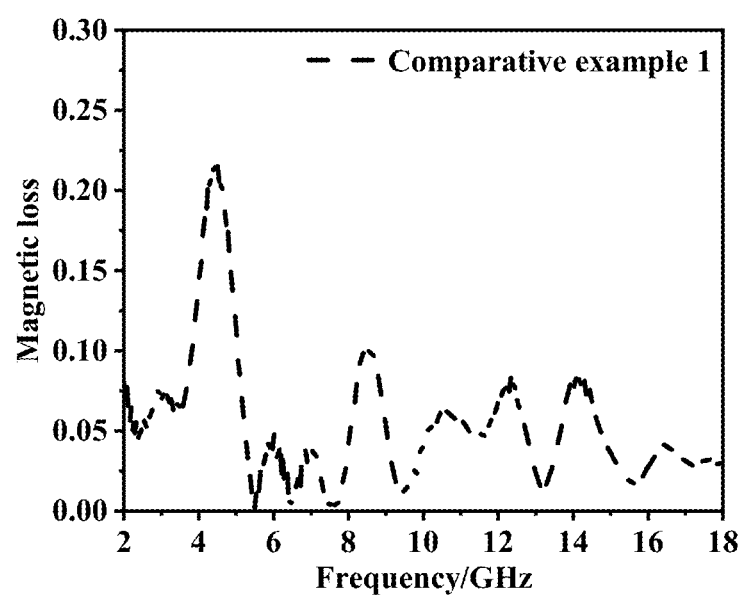
FIG. 15 shows a magnetic loss curve of the Fe sub-nanocluster-doped reduced graphene oxide dielectric material provided in Comparative Example 1.
Figure 16:
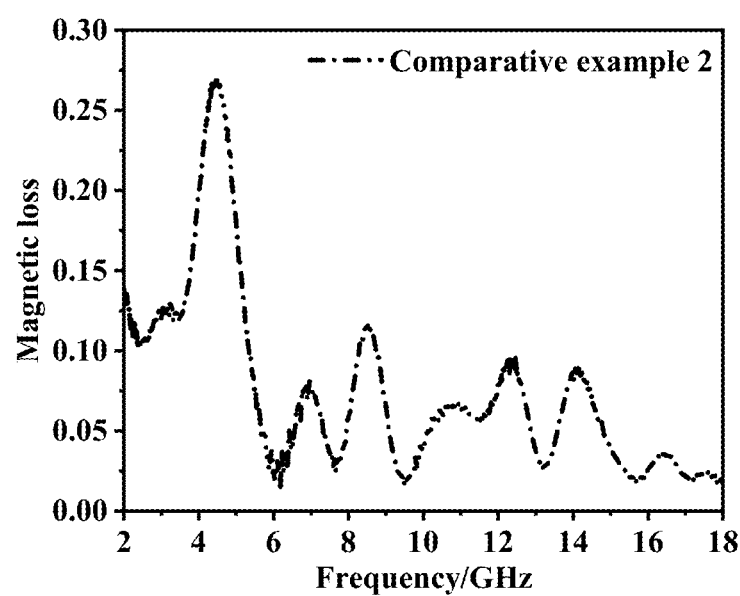
FIG. 16 shows a magnetic loss curve of the Fe-containing nanoparticle-loaded reduced graphene oxide dielectric material provided in Comparative Example 2.
Figure 17:
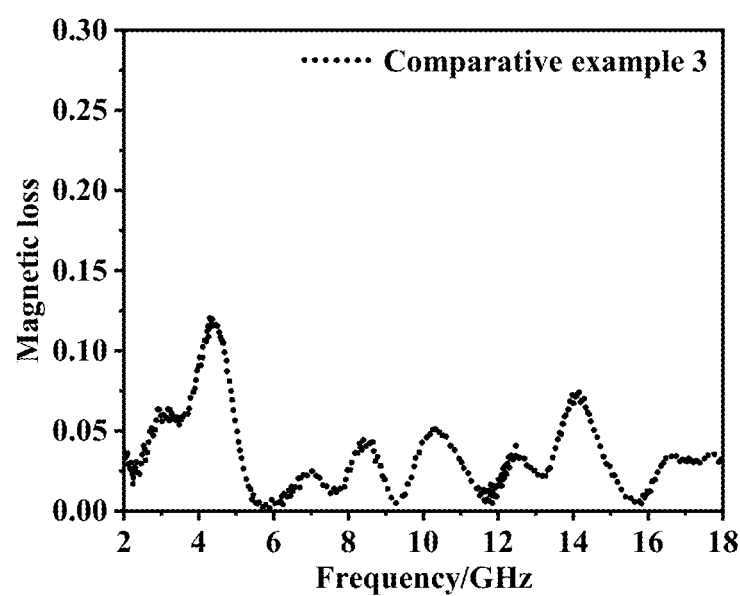
FIG. 17 shows a magnetic loss curve of the microwave-reduced graphene oxide dielectric material provided in Comparative Example 3.

As shown in a TEM dark-field morphology of the Fe monatomic-doped reduced graphene oxide dielectric material prepared in Example 1 in FIG. 2, a particle size of a bright spot (Fe) is less than 1 nm, and is at a single-atom level, indicating that the dielectric material prepared in Example 1 is indeed a reduced graphene oxide doped with a metal single atom.

FIGS. 3-17 illustrate the dielectric constant, magnetic permeability, and calculated dielectric loss and magnetic loss of paraffin wax composites filled with modified graphene functional particles with the same filler amount within a range of 2-18 GHz obtained through the vector network analyzer test. It can be seen that compared with the Fe sub-nanocluster-doped reduced graphene oxide/paraffin wax composite corresponding to Comparative Example 1, the Fe-containing nanoparticle-loaded reduced graphene oxide/paraffin wax composite corresponding to Comparative Example 2, and the microwave-reduced graphene oxide/paraffin wax composite corresponding to Comparative Example 3, the Fe monatomic-doped reduced graphene oxide/paraffin wax composite corresponding to Example 1 has a significantly changed dielectric constant, with a significantly increased real part of the dielectric constant in a low-frequency range, a significantly increased imaginary part of the dielectric constant in a full frequency range (2-18 GHZ), and a significantly increased dielectric loss in the full frequency range. Compared with the paraffin wax composites corresponding to Comparative Examples 1-3, a changing trend of the magnetic permeability of the Fe monatomic-doped reduced graphene oxide/paraffin wax composite corresponding to Example 1 has no obvious difference, indicating that the influence of changes in magnetic loss on the electromagnetic wave absorption properties of the materials prepared in Example 1 and Comparative Examples 1-3 can be neglected.

Figure 18:
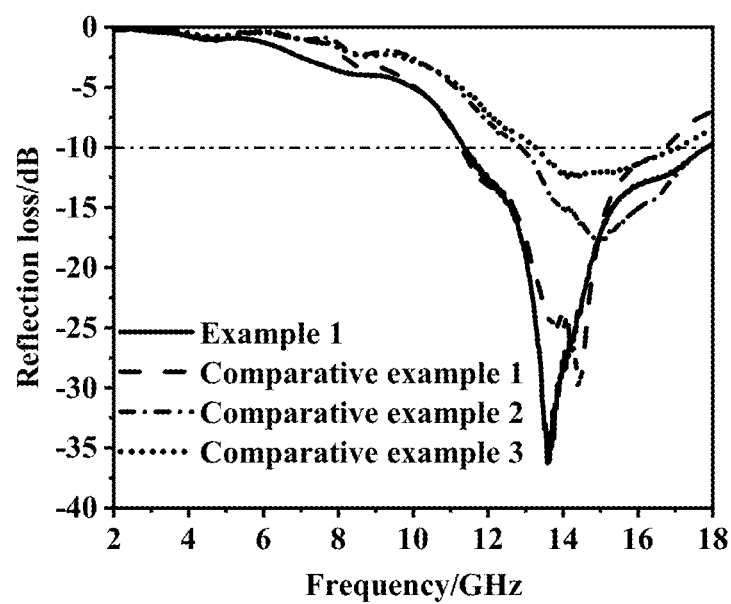
FIG. 18 shows a comparison of electromagnetic wave absorption performance (Reflection loss) curves of the Fe monatomic-doped reduced graphene oxide dielectric material provided in Example 1 of the present disclosure, the Fe sub-nanocluster-doped reduced graphene oxide dielectric material provided in Comparative Example 1, the Fe-containing nanoparticle-loaded reduced graphene oxide dielectric material provided in Comparative Example 2, and the microwave-reduced graphene oxide dielectric material provided in Comparative Example 3.

FIG. 18 illustrates the electromagnetic wave absorption performance of the paraffin wax composites filled with the modified graphene functional particles with the same filler amount within the range of 2-18 GHz as calculated by means of transmission line theory. It can be seen that the Fe monatomic-doped reduced graphene oxide/paraffin wax composite corresponding to Example 1 with a filling amount of only 1 wt. % of the paraffin wax composite has a maximum effective absorption bandwidth of 6.46 GHZ, which is 19% higher than that of the Fe sub-nanocluster-doped reduced graphene oxide/paraffin wax composite (5.44 GHZ) with the same filling amount corresponding to Comparative Example 1, 31% higher than that of the Fe-containing nanoparticle-loaded reduced graphene oxide/paraffin wax composite (4.92 GHz) with the same filling amount corresponding to Comparative Example 2, and 70% higher than that of the microwave-reduced graphene oxide/paraffin wax composite (3.80 GHz) with the same filling amount corresponding to Comparative Example 3.

Example 2

Provided herein was an efficient microwave preparation method with one-step simultaneous reduction/embedding of a Fe monatomic-doped reduced graphene oxide dielectric material, which was basically the same as that in Example 1, except that the concentration of the graphene oxide aqueous dispersion in step (1) was 1 mg/mL.

The obtained Fe monatomic-doped reduced graphene oxide dielectric material had a resistivity of $8.56 \times 10^{-2}$ Ω·m, which was 1336% higher than that of the microwave-reduced graphene oxide dielectric material ($5.96 \times 10^{-3}$ Ω·m) prepared by the same reduction process in Comparative Example 4, and can be used in the fields of supercapacitors, hydrogen storage materials, batteries, transistors, biosensors, and electromagnetic wave absorbing materials. When used in the field of electromagnetic wave absorbing materials, the composite of the Fe monatomic-doped reduced graphene oxide dielectric material with a filling amount of only 1 wt. % had a maximum effective absorption bandwidth of 5.66 GHz, which was 61% higher than that of a composite of the microwave-reduced graphene oxide dielectric material (3.52 GHz) with the same filling amount of the composite prepared by the same reduction process in Comparative Example 4.

Example 3

Provided herein was an efficient microwave preparation method with one-step simultaneous reduction/embedding of a Fe monatomic-doped reduced graphene oxide dielectric material, which was basically the same as that in Example 1, except that the concentration of the aqueous ferric sulfate solution prepared in step (2) was 0.028 mg/mL.

The obtained Fe monatomic-doped reduced graphene oxide dielectric material had a resistivity of $9.91 \times 10^{-2}$ Ω·m, which was 1615% higher than that of the microwave-reduced-graphene oxide dielectric material ($5.78 \times 10^{-3}$ Ω·m) prepared by the same reduction process in Comparative Example 3, and can be used in the fields of supercapacitors, hydrogen storage materials, batteries, transistors, biosensors, and electromagnetic wave absorbing materials. When used in the field of electromagnetic wave absorbing materials, the composite of the Fe monatomic-doped reduced graphene oxide dielectric material with a filling amount of only 1 wt. % had a maximum effective absorption bandwidth of 4.92 GHz, which was 30% higher than that of a composite of the microwave-reduced graphene oxide dielectric material (3.80 GHz) with the same filling amount of the composite material prepared by the same reduction process in Comparative Example 3.

Example 4

Provided herein was an efficient microwave preparation method with one-step simultaneous reduction/embedding of a Fe monatomic-doped reduced graphene oxide dielectric material, which was basically the same as that in Example 1, except that the concentration of the aqueous ferric sulfate solution prepared in step (2) was 0.13 mg/mL.

The obtained Fe monatomic-doped reduced graphene oxide dielectric material had a resistivity of $4.80 \times 10^{-2}$ Ω·m, which was 730% higher than that of the microwave-reduced graphene oxide dielectric material ($5.78 \times 10^{-3}$ Ω·m) prepared by the same reduction process in Comparative Example 3, and can be used in the fields of supercapacitors, hydrogen storage materials, batteries, transistors, nanoelectronics, biosensors, and electromagnetic wave absorbing materials. When used in the field of electromagnetic wave absorbing materials, the composite of the Fe monatomic-doped reduced graphene oxide dielectric material with a filling amount of only 1 wt. % had a maximum effective absorption bandwidth of 4.68 GHz, which was 23% higher than that of a composite of the microwave-reduced graphene oxide dielectric material (3.80 GHz) with the same filling amount of the composite material prepared by the same reduction process in Comparative Example 3.

Example 5

Provided herein was an efficient microwave preparation method with one-step simultaneous reduction/embedding of a Fe monatomic-doped reduced graphene oxide dielectric material, which was basically the same as that in Example 1, except that the microwave power in step (5) was 700 W.

The obtained Fe monatomic-doped reduced graphene oxide dielectric material had a resistivity of $6.49 \times 10^{-2}$ Ω·m, which was 1855% higher than that of the microwave-reduced graphene oxide dielectric material ($3.32 \times 10^{-3}$ Ω·m) prepared by the same reduction process in Comparative Example 5, and can be used in the fields of supercapacitors, hydrogen storage materials, batteries, transistors, nanoelectronics, biosensors, and electromagnetic wave absorbing materials. When used in the field of electromagnetic wave absorbing materials, the composite of the Fe monatomic-doped reduced graphene oxide dielectric material with a filling amount of only 1 wt. % had a maximum effective absorption bandwidth of 5.90 GHz, which was 64% higher than that of a composite of the microwave-reduced graphene oxide dielectric material (3.60 GHZ) with the same filling amount of the composite material prepared by the same reduction process in Comparative Example 5.

Example 6

Provided herein was an efficient microwave preparation method with one-step simultaneous reduction/embedding of a Fe monatomic-doped reduced graphene oxide dielectric material, which was basically the same as that in Example 1, except that the microwave power in step (5) was 100 W.

The obtained Fe monatomic-doped reduced graphene oxide dielectric material had a resistivity of $3.64 \times 10^{-2}$ Ω·m, which was 276% higher than that of the microwave-reduced graphene oxide dielectric material ($9.67 \times 10^{-3}$ Ω·m) prepared by the same reduction process in Comparative Example 6, and can be used in the fields of supercapacitors, hydrogen storage materials, batteries, transistors, nanoelectronics, biosensors, and electromagnetic wave absorbing materials. When used in the field of electromagnetic wave absorbing materials, the composite of the Fe monatomic-doped reduced graphene oxide dielectric material with a filling amount of only 1 wt. % had a maximum effective absorption bandwidth of 3.19 GHz, which was 10% higher than that of a composite of the microwave-reduced graphene oxide dielectric material (2.90 GHz) with the same filling amount of the composite material prepared by the same reduction process in Comparative Example 6.

Example 7

Provided herein was an efficient microwave-assisted preparation method with one-step simultaneous reduction/embedding of a Fe monatomic-doped reduced graphene oxide dielectric material, which was basically the same as that in Example 1, except that the microwave treatment was performed for 4 s.

The obtained Fe monatomic-doped reduced graphene oxide dielectric material had a resistivity of $1.26 \times 10^{-1}$ Ω·m, which was 2014% higher than that of the microwave-reduced graphene oxide dielectric material ($5.96 \times 10^{-3}$ Ω·m) prepared by the same reduction process in Comparative Example 7, and can be used in the fields of supercapacitors, hydrogen storage materials, batteries, transistors, nanoelectronics, biosensors, and electromagnetic wave absorbing materials. When used in the field of electromagnetic wave absorbing materials, the composite of the Fe monatomic-doped reduced graphene oxide dielectric material with a filling amount of only 1 wt. % had a maximum effective absorption bandwidth of 5.93 GHz, which was 67% higher than that of a composite of the microwave-reduced graphene oxide dielectric material (3.55 GHz) with the same filling amount of the composite material prepared by the same reduction process.

Example 8

Provided herein was an efficient microwave preparation method with one-step simultaneous reduction/embedding of a Fe monatomic-doped reduced graphene oxide dielectric material, which was basically the same as that in Example 1, except that the microwave treatment was performed for 14 s.

The obtained Fe monatomic-doped reduced graphene oxide dielectric material had a resistivity of $8.20 \times 10^{-3}$ Ω·m, which was 276% higher than that of the microwave-reduced graphene oxide dielectric material ($2.18 \times 10^{-3}$ Ω·m) prepared by the same reduction process in Comparative Example 8, and can be used in the fields of supercapacitors, hydrogen storage materials, batteries, transistors, nanoelectronics, biosensors, and electromagnetic wave absorbing materials. When used in the field of electromagnetic wave absorbing materials, the composite of the Fe monatomic-doped reduced graphene oxide dielectric material with a filling amount of only 1 wt. % had a maximum effective absorption bandwidth of 4.54 GHz, which was 62% higher than that of a composite of the microwave-reduced graphene oxide dielectric material (2.80 GHz) with the same filling amount of the composite material prepared by the same reduction process in Comparative Example 8.

Example 9

Provided herein was an efficient microwave preparation method with one-step simultaneous reduction/embedding of a Co monatomic-doped reduced graphene oxide dielectric material, which was basically the same as that in Example 1, except that the metal salt powder in step (2) was cobalt sulfate.

The obtained Co monatomic-doped reduced graphene oxide dielectric material had a resistivity of $9.68 \times 10^{-2}$ Ω·m, which was 1575% higher than that of the microwave-reduced graphene oxide dielectric material ($5.78 \times 10^{-3}$ Ω·m) prepared by the same reduction process in Comparative Example 3, and can be used in the fields of supercapacitors, hydrogen storage materials, batteries, transistors, biosensors, and electromagnetic wave absorbing materials. When used in the field of electromagnetic wave absorbing materials, the composite of the Co monatomic-doped reduced graphene oxide dielectric material with a filling amount of only 1 wt. % had a maximum effective absorption bandwidth of 6.22 GHz, which was 64% higher than that of a composite of the microwave-reduced graphene oxide dielectric material (3.80 GHz) with the same filling amount of the composite material prepared by the same reduction process in Comparative Example 3.

Example 10

Provided herein was an efficient microwave preparation method with one-step simultaneous reduction/embedding of a Ni monatomic-doped reduced graphene oxide dielectric material, which was basically the same as that in Example 1, except that the metal salt powder in step (2) was nickel sulfate.

The obtained Ni monatomic-doped reduced graphene oxide dielectric material had a resistivity of $9.96 \times 10^{-2}$ Ω·m, which was 1623% higher than that of the microwave-reduced graphene oxide dielectric material ($5.78 \times 10^{-3}$ Ω·m) prepared by the same reduction process in Comparative Example 3, and can be used in the fields of supercapacitors, hydrogen storage materials, batteries, transistors, biosensors, and electromagnetic wave absorbing materials. When used in the field of electromagnetic wave absorbing materials, the composite of the Ni monatomic-doped reduced graphene oxide dielectric material with a filling amount of only 1 wt. % had a maximum effective absorption bandwidth of 6.06 GHZ, which was 59% higher than that of a composite of the microwave-reduced graphene oxide dielectric material (3.80 GHz) with the same filling amount of the composite material prepared by the same reduction process in Comparative Example 3.

The embodiments described above are merely illustrative of the present application, and are not intended to limit the scope of the present application, enabling those skilled in the art to understand or implement the present disclosure. Although detailed descriptions have been made with reference to the above embodiments, modifications for the technical solutions recorded in the above embodiments, or equivalent substitutions for some or all of the technical features made by those of ordinary skill in the art shall fall within the scope of the disclosure defined by the appended claims.

What is claimed is:

1. An efficient microwave preparation method with one-step simultaneous reduction/embedding of a metal monatomic-doped reduced graphene oxide dielectric material, comprising:
   step (1) adding deionized water to a graphene oxide slurry followed by an ultrasonic dispersion to obtain a graphene oxide aqueous dispersion with a preset concentration, wherein the preset concentration of the graphene oxide aqueous dispersion is 1-3 mg/mL;
   step (2) dissolving a metal salt in a powder form with deionized water to obtain a metal salt aqueous solution with a preset concentration, wherein the metal salt is selected from the group consisting of an iron salt, a cobalt salt, a nickel salt and a combination thereof, and the preset concentration of the metal salt aqueous solution is 0.02-0.20 mg/mL;
   step (3) adding the metal salt aqueous solution to the graphene oxide aqueous dispersion followed by mechanical stirring to obtain a mixed dispersion, wherein the mechanical stirring is performed such that the metal salt fully interacts with the graphene oxide, and the metal ions are loaded on a surface of the graphene oxide utilizing an interaction between the metal ions and the oxygen-containing functional groups of the graphene oxide;
   step (4) freeze-drying the mixed dispersion obtained in step (3) to obtain a metal salt/graphene oxide complex; and
   step (5) subjecting the metal salt/graphene oxide complex to a microwave treatment in the presence of an initiator in a microwave oven to allow the simultaneous reduction reactions of the metal salt and the graphene oxide and the embedding of the metal atoms generated by the reduction of the metal salts into the lattices of the reduced graphene oxide generated by the reduction of graphene oxide, so as to obtain the metal monatomic-doped reduced graphene oxide dielectric material,
   wherein the initiator is selected from the group consisting of a chopped carbon fiber bundle, a graphite powder, and a copper wire, and the initiator is 1 wt. % of a mass of the metal salt/graphene oxide complex;
   wherein the microwave treatment is performed at 100-700 W for 4-14 s.

2. The efficient microwave preparation method of claim 1, wherein in step (1), the ultrasonic dispersion is performed at 100-300 W for 10-30 min.

3. The efficient microwave preparation method of claim 1, wherein in step (3), the mechanical stirring is performed at 100-300 rpm for 20-40 min.

4. The efficient microwave preparation method of claim 1, wherein in step (4), the mixed solution is freeze-dried at a temperature ranging from −40° C. to −10° C. for 24-72 h.

* * * * *